(12) United States Patent
Tsuji et al.

(10) Patent No.: US 7,011,340 B2
(45) Date of Patent: Mar. 14, 2006

(54) POSITION ADJUSTMENT DEVICE FOR STEERING HANDLE

(75) Inventors: Katsutoshi Tsuji, Kiryu (JP); Masayuki Imai, Kiryu (JP)

(73) Assignee: Yamada Manufacturing Co., Ltd., Kiryu (JP)

( * ) Notice: Subject to any disclaimer, the term of this patent is extended or adjusted under 35 U.S.C. 154(b) by 264 days.

(21) Appl. No.: 10/629,909

(22) Filed: Jul. 30, 2003

(65) Prior Publication Data

US 2004/0104565 A1    Jun. 3, 2004

(30) Foreign Application Priority Data

Jul. 31, 2002  (JP) ............................. 2002-224252
Jul. 15, 2003  (JP) ............................. 2003-274982

(51) Int. Cl.
*B62D 1/18*  (2006.01)

(52) U.S. Cl. ......................................... 280/775; 74/493
(58) Field of Classification Search ................ 280/775, 280/777; 74/493
See application file for complete search history.

(56) References Cited

U.S. PATENT DOCUMENTS

| | | | | |
|---|---|---|---|---|
| 4,648,624 | A | * | 3/1987 | Mouhot et al. ............. 280/775 |
| 4,739,673 | A | * | 4/1988 | Ishikawa et al. ............. 74/493 |
| 4,901,592 | A | * | 2/1990 | Ito et al. ........................ 74/492 |
| 5,286,056 | A | * | 2/1994 | Speich ....................... 280/777 |
| 5,655,413 | A | * | 8/1997 | Barton ......................... 74/493 |
| 5,788,278 | A | * | 8/1998 | Thomas et al. ............. 280/777 |
| 5,961,146 | A | * | 10/1999 | Matsumoto et al. ........ 280/777 |
| 2003/0164608 | A1 | * | 9/2003 | Morita et al. ............... 280/775 |

FOREIGN PATENT DOCUMENTS

JP          64-28365          2/1989

* cited by examiner

*Primary Examiner*—David R. Dunn
(74) *Attorney, Agent, or Firm*—McGinn IP Law Group, PLLC

(57) ABSTRACT

An object of the present invention is to enable very easy installation of a stopper buffering material for absorbing impacts during tilt and telescopic adjustment, in a steering device having a tilt and telescopic adjustment mechanism, and to ensure that the stopper buffering material is not readily detachable, once installed. The present invention comprises: a fixed bracket; a movable bracket; a bolt shaft section; a collar member that is installed between respective supporting side sections of the movable bracket that are mutually opposing in the lateral direction thereof, the collar member being formed into a folded shape from a lower supporting plate section and upper supporting plate section that are mutually opposing in a parallel fashion and combined together with a coupling plate, and the collar member being provided with an end plate formed integrally with the upper supporting plate section on the side opposite to that of the coupling plate, and further provided with a fitting section formed at the lower end of the end plate; and a stopper buffering material, the stopper buffering material being fixed to the end plate of the collar member.

19 Claims, 9 Drawing Sheets

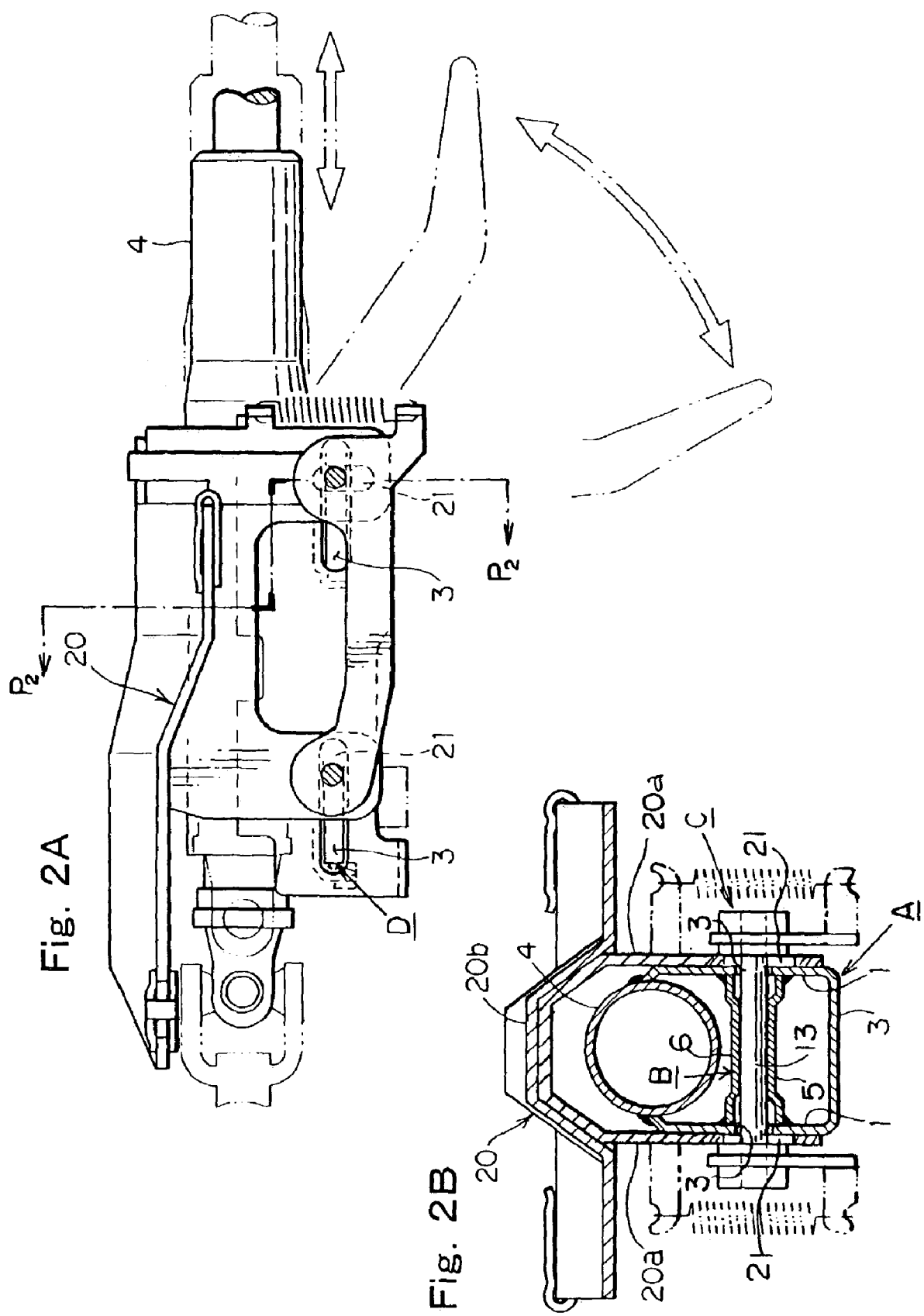

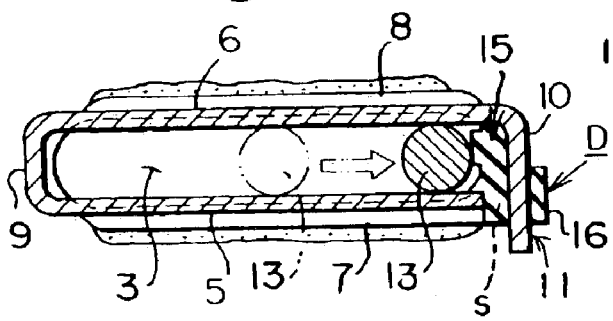
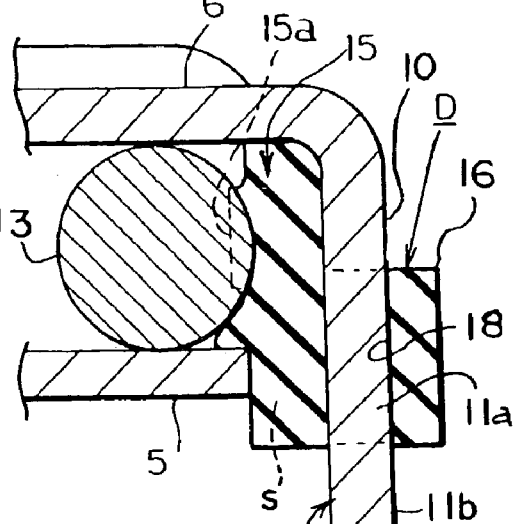
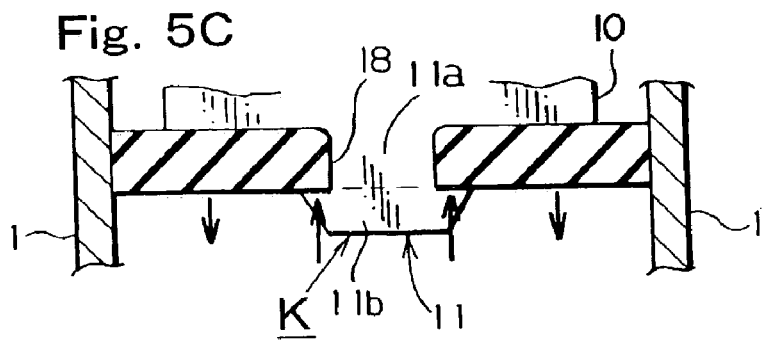
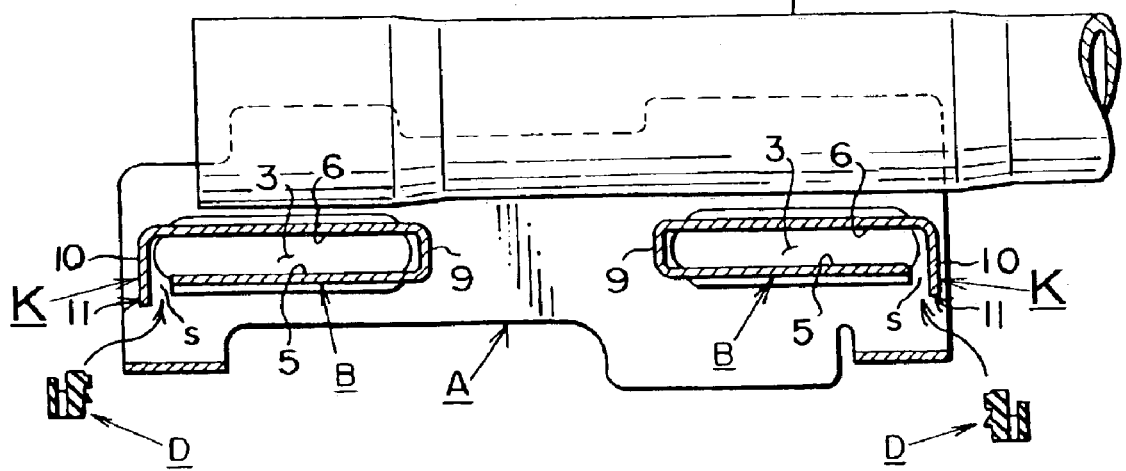

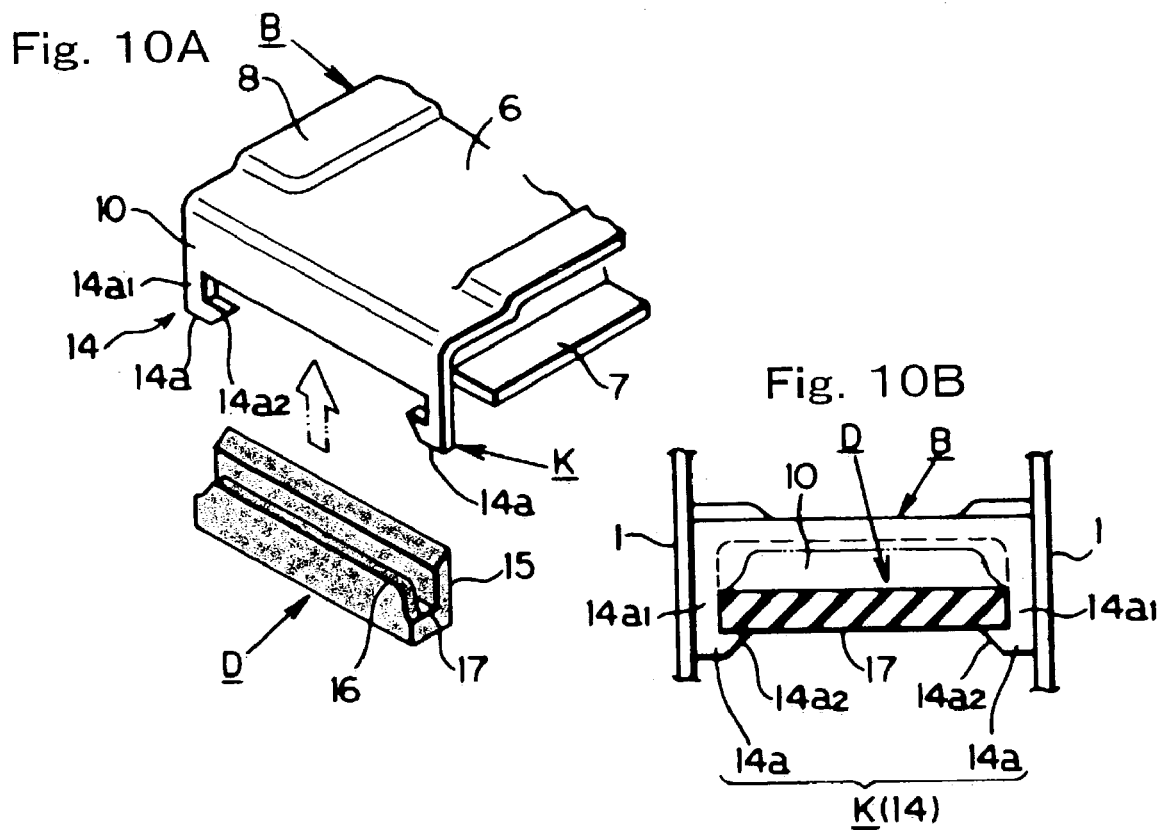
Fig. 10A
Fig. 10B
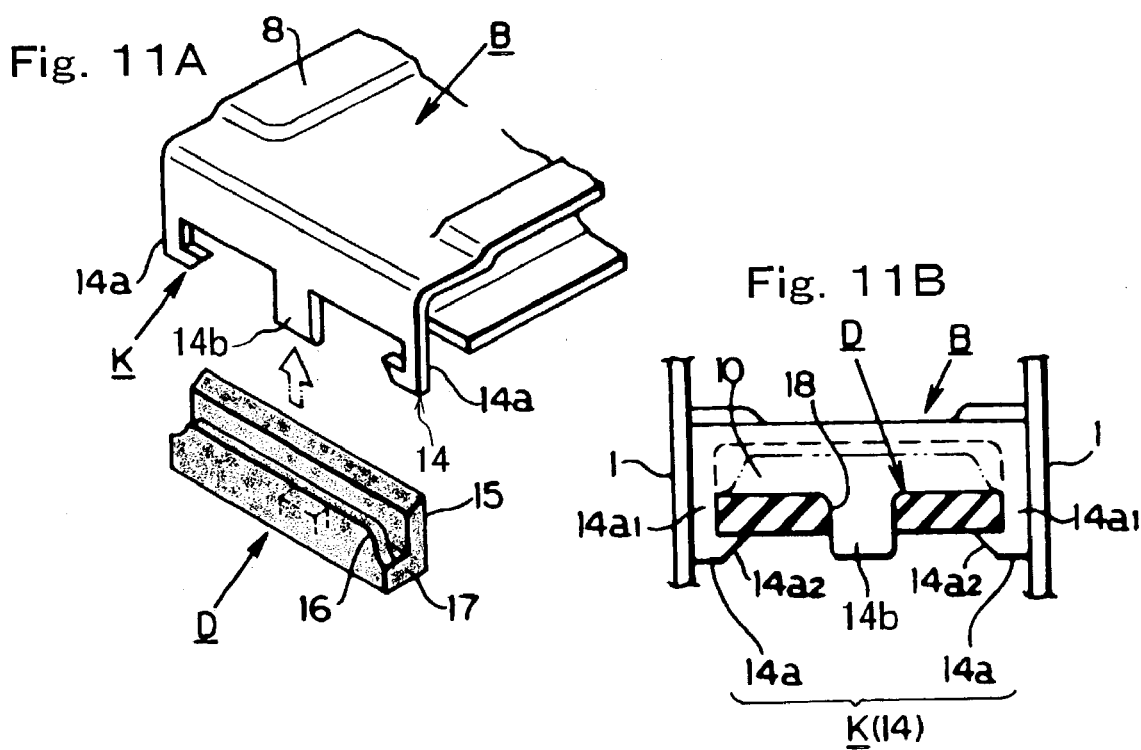
Fig. 11A
Fig. 11B

POSITION ADJUSTMENT DEVICE FOR STEERING HANDLE

BACKGROUND OF THE INVENTION

1. Field of the Invention

The present invention relates to a position adjustment device for a steering handle having a tilt/telescope adjustment mechanism, whereby a stopper buffering material for absorbing shocks when performing tilt/telescope adjustment can be installed very easily, and once installed, the stopper buffering material can be prevented from becoming readily detached.

2. Description of the Related Art

In the prior art, Japanese Laid-open Utility Model Publication No. S64-28365 discloses a position adjustment device for a steering handle wherein a pair of brackets are fixed integrally with a steering column at a uniform interval by means of spacers, a long groove being formed in the axial direction of the brackets and a lock lever shaft being inserted and positioned inside the long groove and the spacers.

If the end members of a steering column are caused to move in the forward direction or backward direction of the range of movement thereof, when the movement of the steering column is being adjusted in the axial direction, then the lock lever shaft will abut against the end portion of the long groove, thereby forming a stopper in the axial direction. Since the driver is not aware of the stopper position caused by abutting between the lock lever shaft and the end member of the long groove of the bracket, when performing the operation of adjusting the movement in the axial direction, the driver will adjust the movement to any desired position, and hence, if the stopper is struck, this will create an impact type abutment without any adjustment in the force applied. Since there is a metallic contact between the lock lever shaft and the long groove end portion of the members, the steering feel is impaired by the occurrence of the impact type abutment in the stopper.

Consequently, there have been cases where a stopper material made from rubber, synthetic resin, or the like, is installed at the position of abutment with the lock lever shaft, thereby dampening the impact. However, if pressure fitting is adopted for the installation structure of the stopper material, then it is difficult to install the stopper material in a controlled manner by suitable pressure fitting, on a plate shaped installation section of a collar. Moreover, if the pressure fitting load is small, then although installation characteristics are improved, the material becomes more liable to detachment, due to shocks, or the like. Furthermore, since a steering device generally comprises a large number of components packed into a small space, then the task of installing the stopper material is very troublesome, and if the pressure fitting load is large, then the installation characteristics are further impaired.

SUMMARY OF THE INVENTION

Therefore, as a result of thorough research undertaken by the inventors in order to resolve the foregoing problems, the present invention has been devised as a position adjustment device for a steering handle, comprising: a fixed bracket; a movable bracket; a bolt shaft section for coupling the fixed bracket and movable bracket A; a collar member, installed between respective supporting side sections of the movable bracket that are mutually opposing in the lateral direction thereof, wherein a lower supporting plate section and upper supporting plate section that are mutually opposing in a parallel fashion are formed into a folded shape in combination with a coupling plate, an end plate being formed integrally from the upper supporting plate section on the side opposite to that of the coupling plate, and there being provided a fitting section connected to the lower end of the end plate consisting of a constricted section and a fitting projection formed to a greater width than the constricted section; and a stopper buffering material which fits with and fixes to the fitting section; wherein a fitting through hole having a smaller width than the fitting projection of the fitting section is formed in the stopper buffering material; and hence the stopper buffering material can be installed easily, and once installed, the stopper buffering material cannot become readily detached, thus resolving the aforementioned problems.

A first aspect of the present invention provides a position adjustment device for a steering handle, comprising: a fixed bracket 20; a movable bracket A; a bolt shaft section 13 for coupling the fixed bracket 20 and movable bracket A; a collar member B that is installed between respective supporting side sections 1, 1 of the movable bracket A that are mutually opposing in the lateral direction thereof, the collar member B being formed into a folded shape from a lower supporting plate section 5 and upper supporting plate section 6 that are mutually opposing in a parallel fashion and combined together with a coupling plate 9, and the collar member B being provided with an end plate 10 formed integrally with the upper supporting plate section 6 on the side opposite to that of the coupling plate 9, and further provided with a fitting section K formed at the lower end of the end plate 10; and a stopper buffering material D, the stopper buffering material D being fixed to the end plate 10 of the collar member B. As a result, excellent assembly characteristics can be obtained for a steering device having a tilt and telescopic adjustment mechanism, by firmly fitting the stopper buffering material D which absorbs impacts when performing tilt and telescopic adjustment.

A second aspect of the present invention provides a position adjustment device for a steering handle, comprising: a fixed bracket 20; a movable bracket A; a bolt shaft section 13 for coupling the fixed bracket 20 and movable bracket A: a collar member B that is installed between respective supporting side sections 1, 1 of the movable bracket A that are mutually opposing in the lateral direction thereof, the collar member B being formed into a folded shape from a lower supporting plate section 5 and upper supporting plate section 6 that are mutually opposing in a parallel fashion and combined together with a coupling plate 9, and the collar member B being provided with an end plate 10 formed integrally with the upper supporting plate section 6 on the side opposite to that of the coupling plate 0, and further provided with a first fitting section 11 connected to the lower end of said end plate 10 and consisting of a constricted section 11a and a fitting projection 11b formed to a greater width than the constricted section 11a; and a stopper buffering material D firmly fitted with said first fitting section 11, the stopper buffering material D being formed with a fitting through hole 18 having a smaller width than the fitting projection 11b of the first fitting section 11. According to this constitution, the stopper buffering material D that absorbs impacts when performing tilt and telescopic adjustment can be installed very easily n a steering device having a tilt and telescopic adjustment mechanism and, furthermore, once installed, the stopper buffering material can be prevented from becoming detached readily.

To describe the effects of the foregoing in detail, an end plate 10 is formed integrally from the upper supporting plate section 6 and on the opposite side to the coupling plate 9, and a first fitting section 11 comprising a constricted section 11a and a fitting projection 11b formed to a larger width than the constricted section 11a is formed from the lower end of the end plate 10. A stopper buffering material D which fits with and fixes to the first fitting section 11 is provided, and this stopper buffering material D can be installed easily and can be prevented from detaching readily. Moreover, since the first fitting section 11 is formed in a downward direction from the end plate 10, it can be made readily installable on the movable bracket A (see FIG. 6).

A third aspect of the present invention provides a position adjustment device for a steering handle, comprising: a fixed bracket 20; a movable bracket A; a bolt shaft section 13 for coupling said fixed bracket 20 and movable bracket A; and a collar member B that is installed between respective supporting side sections1, 1 of the movable bracket A that are mutually opposing in the lateral direction thereof, the collar member B being formed into a folded shape from a lower supporting plate section 5 and upper supporting plate section 6 that are mutually opposing in a parallel fashion and combined together with a coupling plate 9, and the collar member B being provided with an end plate 10 formed integrally with the upper supporting plate section 6 on the side opposite to that of the coupling plate 9, and further provided with a second fitting section 14 consisting of a left and right pair of hook-shaped projecting pieces 14a, 14a comprising vertical projecting pieces $14a_1$, $14a_1$ formed at the lower end and at the laterally opposite sides of the end plate, and horizontal projecting pieces $14a_2$, $14a_2$ projecting inwards from the vertical projecting pieces $14a_1$, $14a_1$ respectively; and a stopper buffering material D, the respective side locations of the stopper buffering material D in the lateral direction thereof being firmly fitted with the hook-shaped pieces 14a, 14a of said second fitting section 14. Therefore, since respective side locations of the stopper buffering material D are fixed by the left and right-hand pair of hook-shaped fitting pieces 14a, 14a, then the holding characteristics of the stopper buffering material D are increased, durability with respect to shocks is improved, and the material can be prevented from becoming detached readily.

A fourth aspect of the present invention provides the position adjustment device for a steering handle according to the third aspect, wherein a first fitting section 11 comprising a constricted section 11a and a fitting projection 11b formed to a greater width than the constricted section 11a is formed from the lower end of the end plate 10, at an approximately central position with respect to the two hook-shaped fitting pieces 14a, 14a of the second fitting section 14, and the stopper buffering material D fits with and fixes to the first fitting section 11 and second fitting section 14; and hence the stopper buffering material D is fitted with and fixed by the first fitting section 11 and the second fitting section 14, and this stopper buffering material D becomes difficult to detach from the end plate 10, thereby making it possible to achieve a very strong and durable state of installation.

A fifth aspect of the present invention provides the position adjustment device for a steering handle according to the third aspect, wherein a vertical guide piece 14b is formed between the two hook-shaped projecting pieces 14a, 14a of respective second fitting sections 14, the vertical guide piece 14b being inserted freely into a fitting through hole 18 of the stopper buffering material D; and hence a structure is achieved wherein the stopper buffering material D can readily be fitted with and fixed by the second fitting sections 14, 14, and hence assembly characteristics can be improved.

A sixth aspect of the present invention provides the position adjustment device for a steering handle according to the first, second, third, fourth or fifth aspects, wherein an auxiliary fitting section 12 is formed in the coupling plate 9 of the collar member B, an installation hole 5a is formed in the lower supporting plate section 5 in the vicinity of the region wherein the first fitting section 11 is formed, and an auxiliary stopper buffering material $D_1$ having a smaller width than that of the stopper buffering material D is installed on the auxiliary fitting section 12; and therefore a stopper buffering material D and an auxiliary stopper buffering material $D_1$ can be installed on the front and rear ends of the collar member B, thus making it possible further to improve the shock absorbing function.

A seventh aspect of the invention provides the position adjustment device for a steering handle according to the first, second, third, fourth or fifth aspects, wherein the stopper buffering material D comprises abutment sections 15 abutting against the bolt shaft section 13, formed symmetrically in an approximately parallel fashion at a suitable interval apart, a fitting through hole 18 capable of fitting with the first fitting section 11 or the auxiliary fitting section 12 being formed between the respective abutment sections 15, 15; and hence the operability of installing the stopper buffering material D on the first fitting section 11 or the auxiliary fitting section 12 is improved. Here, the stopper buffering material D (including the auxiliary stopper buffering material $D_1$) comprises two abutment sections 15, 15, which are formed symmetrically in an approximately parallel fashion at a suitable interval apart, a fitting through hole 18 being formed in the two opposing abutment regions 15, 15.

Therefore, when a stopper buffering material D is fitted with and installed on the first fitting section 11 (or the auxiliary fitting section 12) of the collar member B, it can be installed without any limitation of the direction in which the stopper buffering material D is attached, and hence the ease of the task is improved. Moreover, since one of the abutment sections 15 abuts with the bolt shaft section 13 when the stopper buffering material D has been installed on the collar member B, then even if the stopper buffering material D is used over a long period of time and this one abutment section 15 wears, since the abutment section 15 on the other side is unused, if the stopper buffering material D is removed temporarily from the collar member B, the orientation thereof changed, and the other abutment section 15 made to abut with the bolt shaft section 13, then the stopper buffering material D can be used over a yet longer period of time.

BRIEF DESCRIPTION OF THE DRAWINGS

FIG. 2A is a side view of a steering shaft device in which the present invention is installed; and FIG. 2B is a view in the direction of arrows $P_2$—$P_2$ in A;

FIG. 5A is a diagram of the action of a bolt shaft section contacting with the stopper buffering material;

FIG. 5B is an enlarged diagram of the principal part of A; and

FIG. 5C is a sectional view showing a state where the fitting installation hole of the stopper buffering material is fitted with a fitting section;

FIG. 6 is a process diagram wherein stopper buffering materials are being installed on collar members installed on a movable bracket;

FIG. 10A is an exploded oblique view of a stopper buffering material and the principal part of a collar member of a type wherein the fitting section is constituted by a second fitting section only; and FIG. 10B is a sectional view of the principal part of a state wherein the stopper buffering material is installed on the collar member; and FIG. 11A is an exploded oblique view of a stopper buffering material and the principal part of a collar member of a type wherein the fitting section is constituted by a second fitting,section and a vertical guide piece; and FIG. 11B is a sectional view of the principal part of a state wherein the stopper buffering material is installed on the collar member.

DESCRIPTION OF THE PREFERRED EMBODIMENTS

Figure 1A:
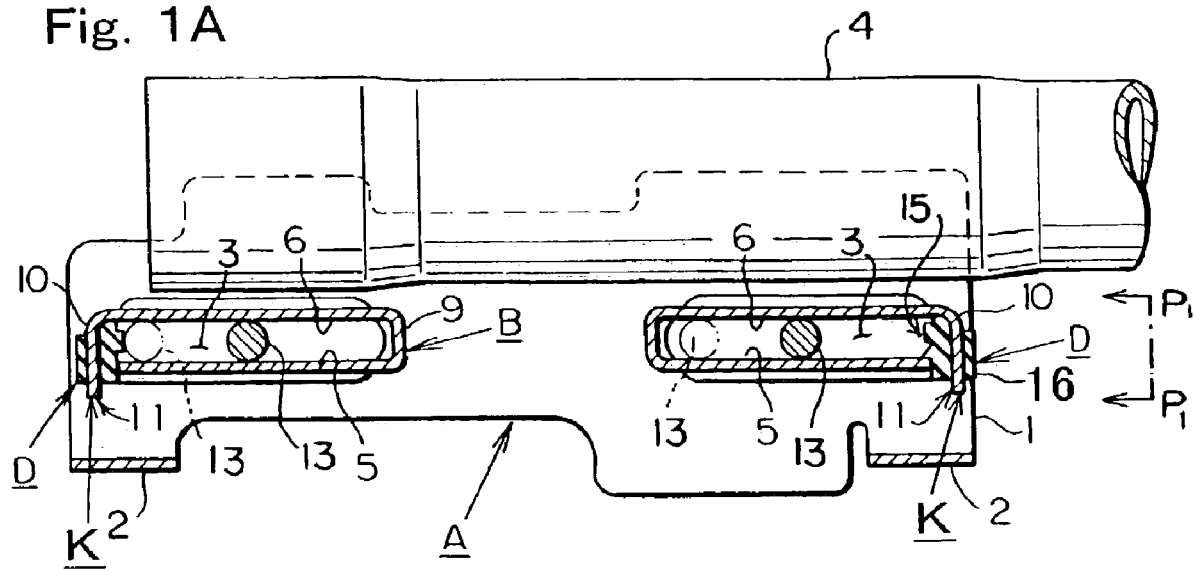
FIG. 1A is a vertical sectional side view showing a first embodiment of the present invention.

Below, embodiments of the present invention are described with reference to the drawings. Firstly, as illustrated in FIG. 1A, FIG. 2, and the like, the present invention is principally constituted by a fixing bracket 20, a movable bracket A, a collar member B, and a lock lever shaft C. Firstly, the fixed bracket 20 is constituted by a pair of left and right-hand fixed supporting side plates 20a, 20a, and an attached top section 20b. The attached top section 20b is installed at a prescribed position on the vehicle via capsule members, in such a manner that it is able to absorb impact energy.

The movable bracket A is formed with supporting side sections 1, 1 on either side thereof in the lateral direction. The two supporting side sections 1, 1 are formed with a bottom face section 2 which couples the supporting side sections 1, 1 together in a unified fashion, on the lower side thereof. The steering column 4 is fixed by welding, in a supported and sandwiched state, between the upper ends of the supporting side sections 1, 1, and furthermore, the supporting side sections 1, 1 are installed in a supported and sandwiched state between the respective fixed supporting side plates 20a, 20a, of the fixed bracket 20 described above (see FIGS. 1A and B).

The respective supporting side sections 1, 1 of the movable bracket A are formed with a plurality of elongated adjustment holes 3, 3, . . . for the purpose of performing tilt and telescope adjustment. These elongated adjustment holes 3, 3, . . . are formed following the longitudinal direction of the steering column 4 installed on the movable bracket A. More specifically, two such holes are formed respectively on each supporting side section 1, 1, on the front and rear sides thereof. Furthermore, tilt and telescope adjustment holes 21, 21, . . . are also formed in the fixed supporting side plates 20a, 20a of the fixed bracket 20, their positions being aligned with those of the elongated adjustment holes in the movable bracket A, and the bolt shaft section 13 of a lock lever shaft C being inserted through same.

Figure 3A:
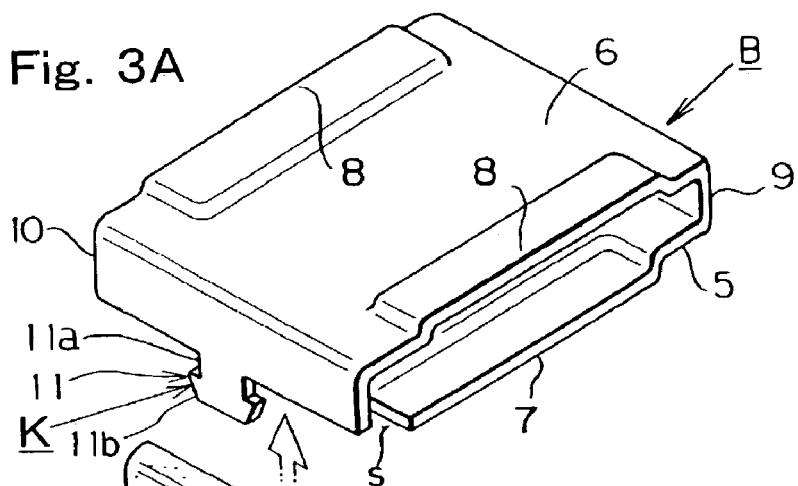
FIG. 3A is an oblique view wherein the collar member and stopper buffering material are separated.
Figure 3B:
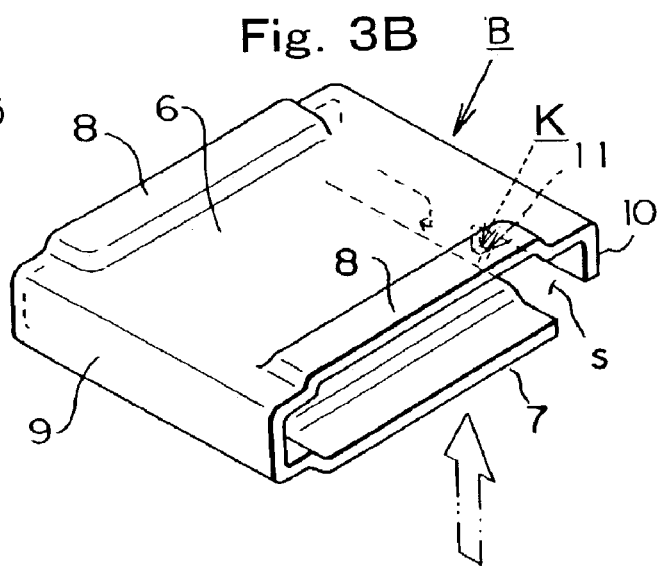
FIG. 3B is an oblique view wherein the collar member and stopper buffering material are separated, as viewed from a different direction.

Next, the collar member B is positioned and fixed between the respective supporting side sections 1, 1 of the movable bracket A. There exist two modes of implementing this collar member B, and in the first mode of implementation, it comprises a lower supporting plate section 5 and an upper supporting plate section 6, which are mutually opposing at an interval of separation that is smaller than the internal diameter of the aforementioned elongated adjustment holes 3 in the vertical direction thereof, the aforementioned lower supporting plate section 5 and the upper supporting plate section 6 being formed in a unified fashion by means of a coupling plate 9. Furthermore, an end plate 10 is formed at a position on the side opposing the coupling plate 9. The end plate 10 is bent downwards from the longitudinal end portion of the upper supporting plate section 6. Furthermore, an installation space s is formed between the end plate 10 and the end edge of the lower supporting plate section 5 on the opposite side to that on which the coupling plate 9 is formed, as illustrated in FIGS. 3A, 3B, FIG. 6, and the like.

Figure 1B:
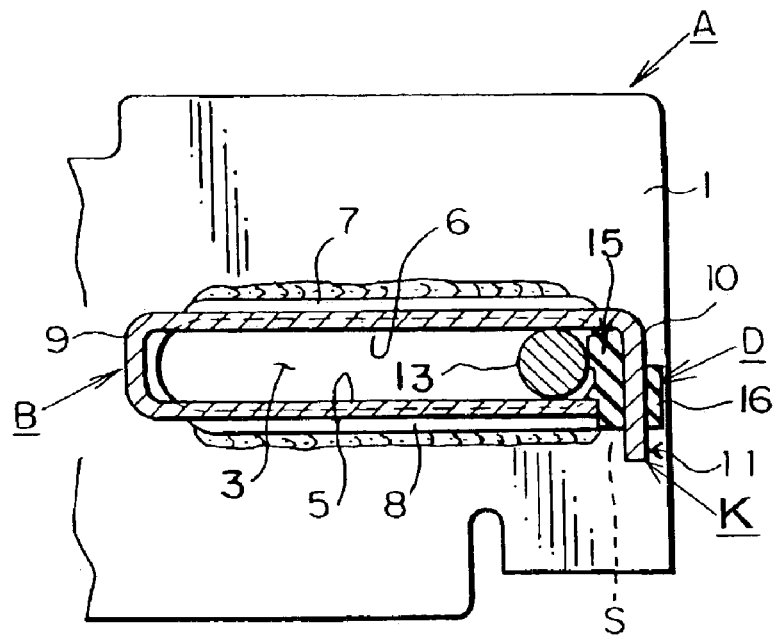
FIG. 1B is an enlarged vertical sectional side view of the principal portion of A.

Firstly, the lower supporting plate section 5 and the upper supporting plate section 6 are mutually opposing in a parallel fashion including almost parallel states, and as illustrated in FIGS. 1A, 1B, the interval between the lower supporting plate section 5 and the upper supporting plate section 6 is virtually the same as, or slightly larger than, the axial diameter of the bolt shaft section 13 of the lock lever shaft C, as described hereinafter. Furthermore, this interval is of a dimension whereby the bolt shaft section 13 is able to slide freely between the lower supporting plate section 5 and the upper supporting plate section 6.

Figure 1C:
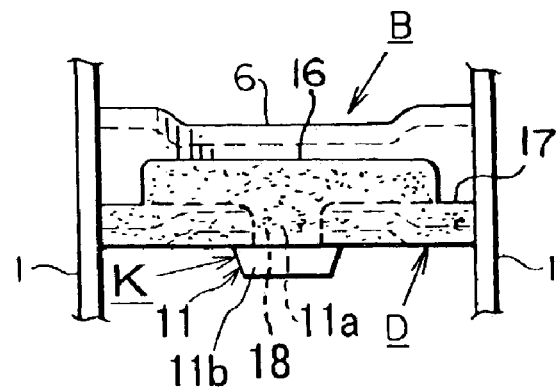
FIG. 1C is a view in the direction of arrows $P_1$—$P_1$ in A.

Furthermore, the opposing faces of the aforementioned lower supporting plate section 5 and upper supporting plate section 6 are both flat, or virtually flat, in such a manner that the bolt shaft section 13 can slide readily. The lower supporting plate section 5 and upper supporting plate section 6 are formed into a unified folded shape, by means of the coupling plate 9. The coupling plate 9 also forms a part which sets the interval between the lower supporting plate section 5 and the upper supporting plate section 6 to a uniform interval. The installation space section s described previously is formed between the end plate 10 and the lower supporting plate section 5, in such a manner that a stopper buffering material D, as described hereinafter, can be installed therein. A fitting section K is formed in the end plate 10. This fitting section K forms a part into which the stopper buffering material D described hereinafter is fitted and affixed. There exist various types of fitting section K, which is constituted by a first fitting section 11 (see FIG. 1, FIG. 3, and the like), and a second fitting section 14 (see FIG. 10). The fitting section K forms a part into which the stopper buffering material D described hereinafter is fitted and affixed.

Figure 3C:
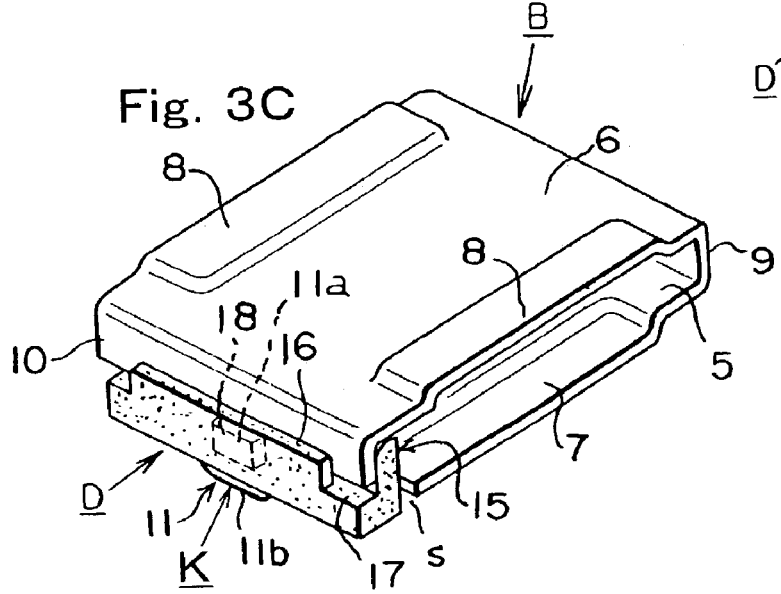
FIG. 3C is an oblique view wherein the stopper buffering material is installed on a collar member.
Figure 4A:
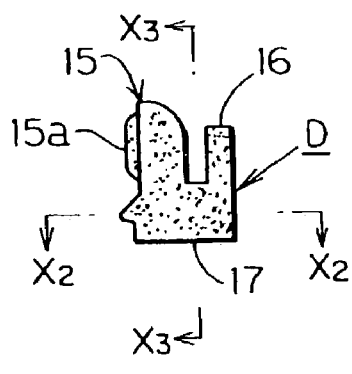
FIG. 4A is a side view of a stopper buffering material.
Figure 4B:
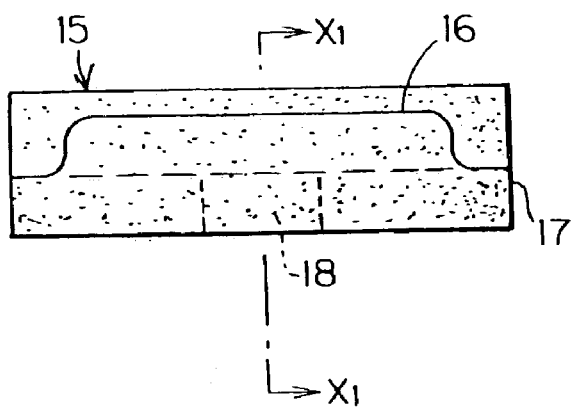
FIG. 4B is a rear side view of a stopper buffering material.
Figure 4C:
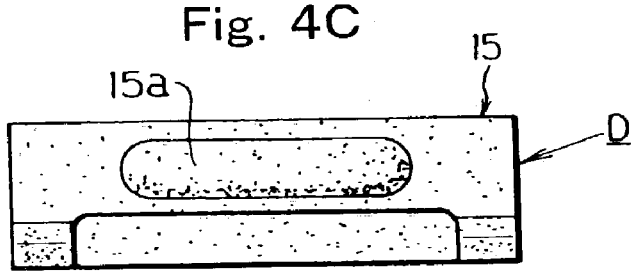
FIG. 4C is a front view of a stopper buffering material.
Figure 4D:
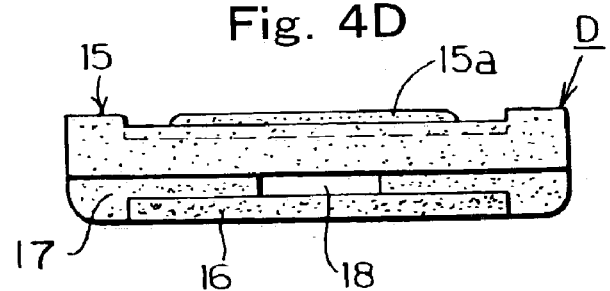
FIG. 4D is a plan view of a stopper buffering material.
Figure 4E:
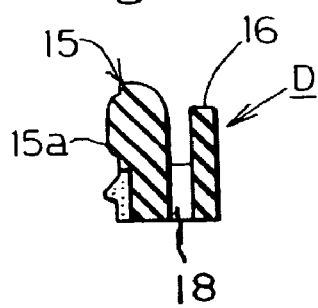
FIG. 4E is a sectional view of a stopper buffering material in the direction of arrows $X_1$—$X_1$.
Figure 4F:
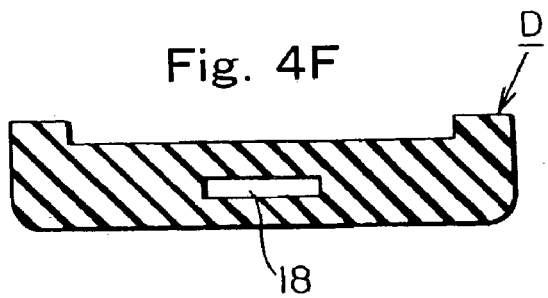
FIG. 4F is a sectional view of a stopper buffering material in the direction of arrows $X_2$—$X_2$.
Figure 4G:
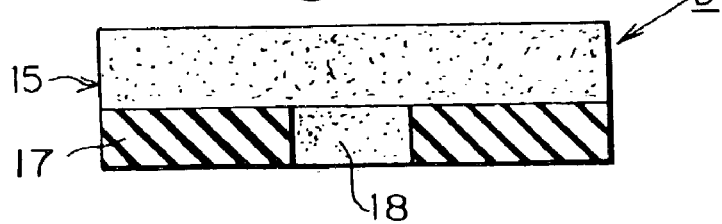
FIG. 4G is a sectional view of a stopper buffering material in the direction of arrows $X_3$—$X_3$.

Thereupon, a stopper buffering material D is formed by an elastic material, such as a rubber material, synthetic resin, or the like. As illustrated in FIG. 3, FIG. 4, and the like, in this stopper buffering material D, an abutment section 15 and a restricting section 16 are formed in a parallel state, and a base section 17 is formed between the abutment section 15 and the restricting section 16. A fitting through hole 18 is formed in the base part 17. The first fitting section 11 is passed through this fitting through hole 18. As illustrated in FIG. 4 and FIGS. 5A and 5B, the abutment section 15 is formed with a flat protruding receiving face 15a against which the bolt shaft section 13 of the lock lever shaft C abuts. Moreover, as described hereinafter, abutment sections 15, 15 are formed symmetrically in a parallel fashion.

Furthermore, a state is achieved wherein the abutment section 15 and the restricting section 16 hold the aforementioned end plate 10 in a sandwiched fashion (see FIGS. 5A and 5C). The fitting through hole 18 is formed in a linear shape. In a first type of the fitting section K, there are formed: a constricted section 11a of approximately the same width as the aforementioned fitting through hole 18, and a fitting projection 11b having an expanding shape, which is larger than the width dimension of the fitting through hole 18, formed in a projecting fashion from the lower end of the constricted section 11a towards either side of the constricted section 11a in the lateral direction (see FIG. 5C). The front end of the fitting projection 11b is formed in a pointed or sharp-ended shape, such as an arc shape or platform shape, or the like. Furthermore, the fitting through hole 18 in the stopper buffering material D has a smaller width that the aforementioned fitting projection 11b, and is expandable and contractable in the width direction due to its elasticity, it being possible to pass the fitting projection 11b through same whilst pressing and expanding the fitting through hole 18. When the fitting projection 11b has passed completely through the fitting through hole 18, the fitting through hole 18 which had been pressed and expanded returns to a width dimension approximately equal to that of the constricted section 11a, and the stopper buffering material D becomes fitted and affixed at the position of the end plate 10.

Next, a second type of fitting section K is described with respect to the second fitting section 14. As illustrated in FIGS. 10A and 10B, this second fitting section 14 is constituted by a left and right-hand pair of hook-shaped fitting pieces 14a, 14a, which project downwards from the lower end of the end plate 10 of the collar member B, at respective side positions in the lateral direction thereof. These respective hook-shaped fitting pieces 14a, 14a are constituted by vertical projecting pieces $14a_1$, $14a_1$ and horizontal projecting pieces $14a_2$, $14a_2$. The vertical projecting pieces $14a_1$, $14a_1$ are formed on the lower end of the end plate 10 at respective side positions in the lateral direction thereof, and the hook-shaped projecting pieces 14a, 14a are formed so as to project inwards in a mutually opposing fashion, from the lower ends of the respective vertical projecting pieces $14a_1$, $14a_1$.

As shown in FIG. 10B, respective side locations of the base section 17 of the aforementioned stopper buffering material D in the lateral direction thereof are held in a sandwiched fashion by the vertical projecting pieces $14a_1$, $14a_1$, and respective locations on the lower face of either end of the base section 17 in the lateral direction thereof are held in a sandwiched fashion by the horizontal projecting pieces $14a_2$, $14a_2$, whereby the stopper buffering material D is installed on the end plate 10. In a composition of this type, it is not necessary to form a fitting through hole 18 in the stopper buffering material D. Since the second fitting section 14 in this second type is constituted by a left and right-hand pair of hook-shaped fitting pieces 14a, 14a, the stopper buffering material D being fitted and fixed in a state where respective side locations thereof in the lateral direction are held in a sandwiched fashion, then it is possible to ensure holding that is well balanced between the left and right-hand sides, and to provide strong and durable fitting and fixing.

Figure 9A:
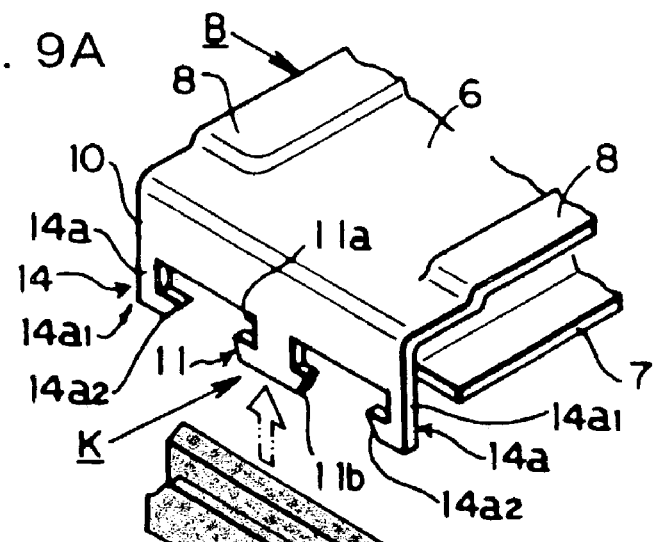
FIG. 9A is an exploded oblique view of a stopper buffering material and the principal part of a collar member of a type wherein the fitting section is constituted by a first fitting section and a second fitting section.
Figure 9B:
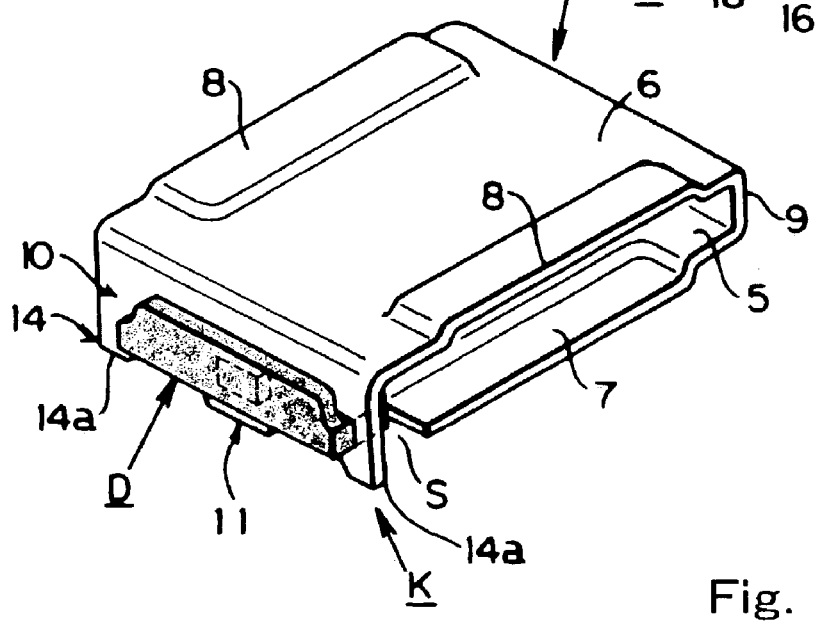
FIG. 9B is an oblique view of a state wherein the stopper buffering material is installed on the collar member.
Figure 9C:
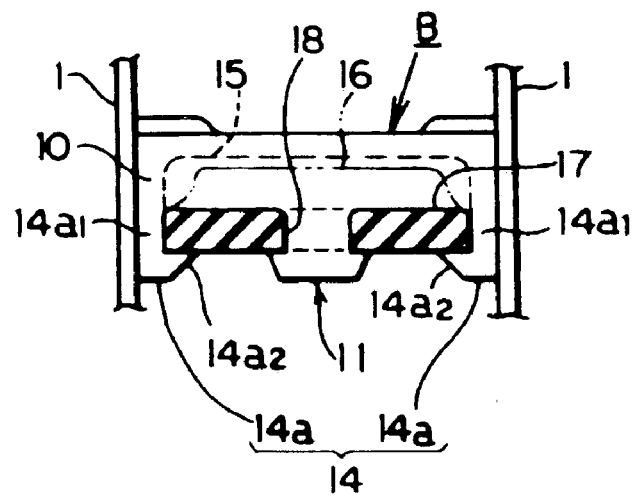
FIG. 9C is a sectional view of the principal part of a state wherein the stopper buffering material is installed on the collar member.

A third type of fitting section K is constituted by the aforementioned first fitting section 11 and the second fitting section 14, as illustrated in FIG. 9A. As shown in FIGS. 9A, 9B, 9C, the stopper buffering material D is fitted and affixed at a central location thereof in the lateral direction, by means of the first fitting section 11, and the respective sides of the stopper buffering material D in the lateral direction are fitted and fixed by means of the second fitting section 14. The stopper buffering material D is fitted and fixed by the first fitting section 11 and the second fitting section 14, and a very strong and durable state of installation can be achieved wherein the stopper buffering material D is not liable to become detached from the end plate 10.

A fourth type of fitting section K, as illustrated in FIG. 11A, has a vertical guide piece 14b formed between two of the aforementioned second fitting sections 14, 14, and does not comprise a first fitting section 11. As shown in FIG. 11B, the vertical guide piece 14b is inserted into the fitting through hole 18 in the stopper buffering material D, thereby providing a structure in which the stopper buffering material D can be fitted and fixed readily to the second fitting sections 14, 14, thus making it possible to improve assembly characteristics.

The collar member B is positioned and fixed between the respective supporting side sections 1, 1 of the movable bracket A, as described previously, and the points of the collar member B which abut,with the respective supporting side section 1, 1 are the lower fixing edge 7 and the upper fixing edge 8. The collar member B is installed between the two supporting side sections 1, 1 of the movable bracket A described above, and in such a manner that it links with the elongated adjustment hole 3. Here, respective lower fixing edges 7, 7 of the collar member B are abutted against the side below the opening of the elongated adjustment hole 3 in the vertical direction of the hole, and are fixed thereto by welding, and similarly, the respective upper fixing edges 8, 8 are abutted against the side above the opening of the elongated adjustment hole 3 in the vertical direction of the hole. Since elongated adjustment holes 3, 3 are formed at two locations in each respective supporting side section 1, in the forward/backward direction thereof, two collar sections B are installed corresponding to the respective adjustment elongated adjustment holes 3. Moreover, the two collar members B, B are positioned in a symmetrical fashion in the forward/backward direction.

Figure 7A:
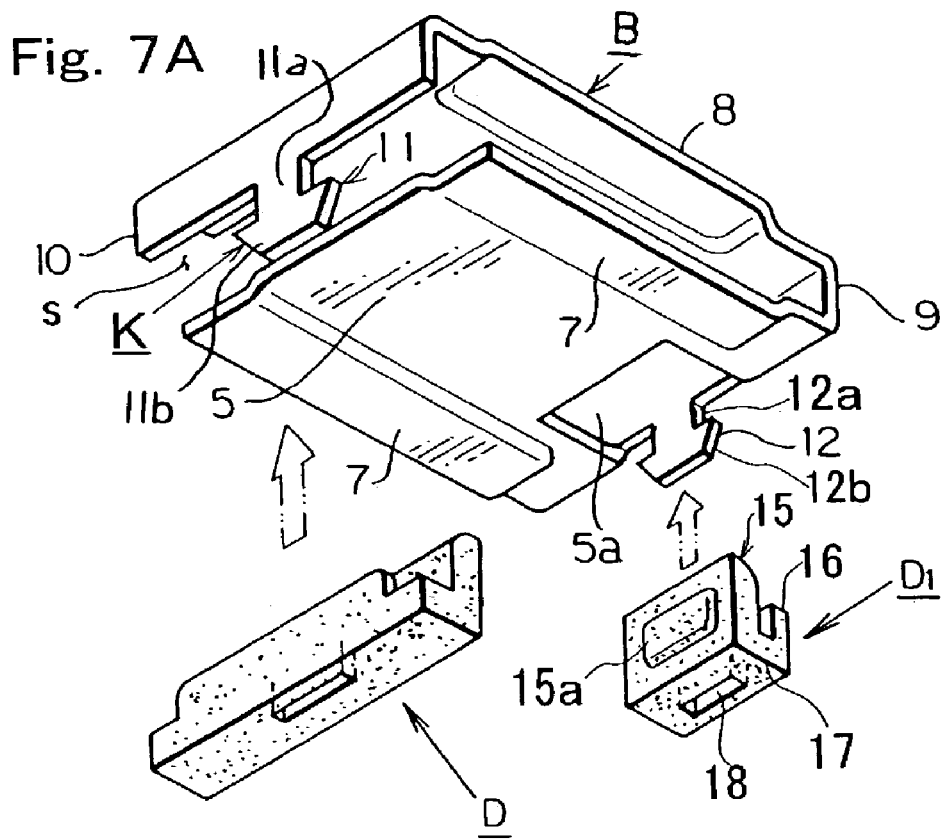
FIG. 7A is an oblique view of a second embodiment of the present invention.
Figure 7B:
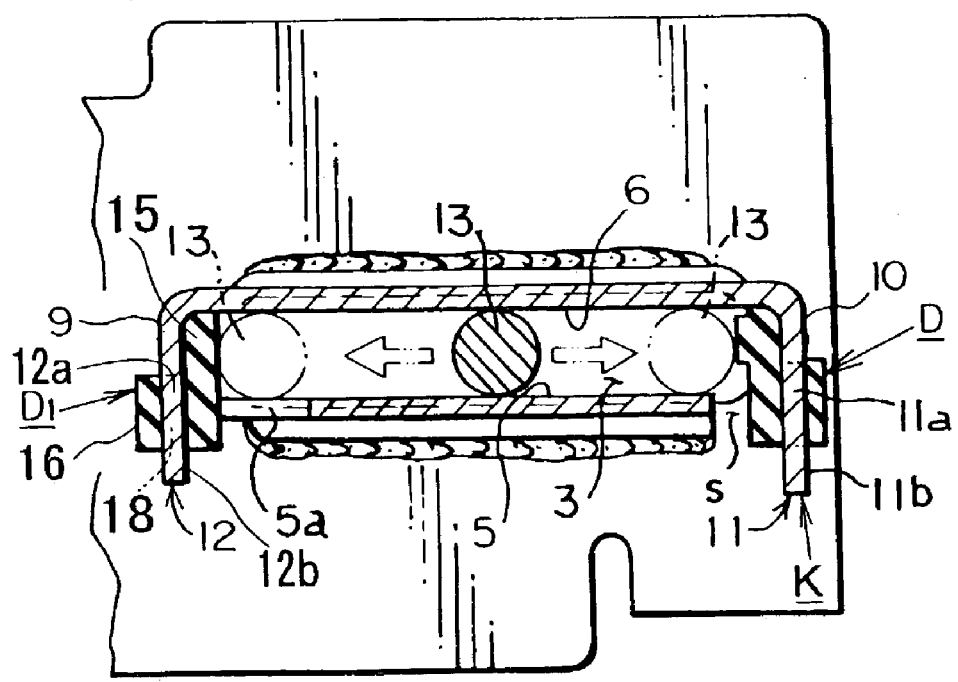
FIG. 7B is an enlarged vertical sectional side view of a second embodiment of the present invention.

Moreover, FIGS. 7A, 7B shows a second embodiment of the present invention, wherein an auxiliary stopper buffering material $D_1$ is installed on the coupling plate 9 of the aforementioned collar member B, and an auxiliary fitting section 12 is formed on the coupling plate 9. The shape of the auxiliary fitting section 12 is practically the same as that of the first fitting section 11 described above, but it is formed to a smaller size in the lateral direction, and more specifically, the auxiliary fitting section 12 is formed by eliminating a portion of the lower supporting plate section 5. Furthermore, the region of the lower supporting plate section 5 from which this portion is eliminated forms an installation hole 5a, and the auxiliary stopper buffering material $D_1$ can be passed through this installation hole 5a when it is installed. The auxiliary stopper buffering material $D_1$ is of approximately the same structure as the stopper buffering material D, being formed from an elastic material, such as rubber, synthetic resin, or the like, and comprising an abutment section 15, a restricting section 16, a base section 17 and a fitting through hole 18 (see FIG. 7A). Moreover, the auxiliary fitting section 12 is also formed in an approximately similar shape to the first fitting section 11 described above, and comprises a constricted section 12a, and fitting projection 12b, the auxiliary stopper buffering material $D_1$ being installed on this auxiliary fitting section 12 (see FIG. 7B).

Figure 8A:
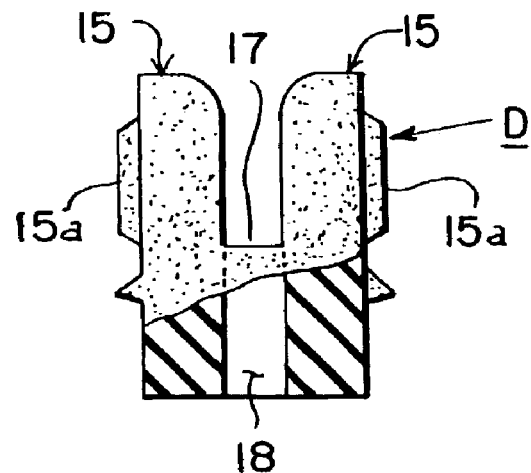
FIG. 8A is a partially cutaway enlarged side view of a stopper buffering material provided with two symmetrical abutment sections.
Figure 8B:
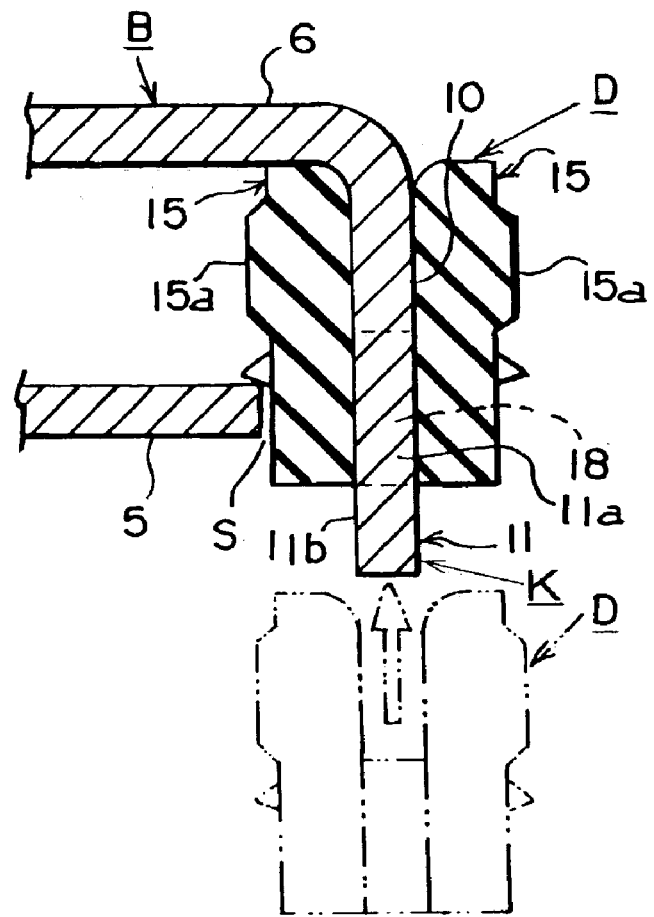
FIG. 8B is an enlarged sectional view of a state where the stopper buffering material in A is fitted and installed on a fitting section of a collar member.

FIG. 8A shows a stopper buffering material D which has two abutment sections 15, 15. These two abutment sections 15, 15 are formed symmetrically at a suitable interval apart. In other words, the respective receiving faces 15a, 15a of these abutment sections 15, 15 face respectively in an outward direction. Moreover, a base section 17 is formed between the adjacent abutment sections 15, 15, and a fitting through hole 18 is formed in the base section 17. Furthermore, a similar structure may also be adopted for the auxiliary stopper buffering material $D_1$. Since this stopper buffering material D including the auxiliary stopper buffering material $D_1$ comprises two abutment sections 15, 15 arranged in a symmetrical fashion, then when installing it on a collar member B, as illustrated in FIG. 8B, it can be installed without any particular limitation on the orientation thereof.

What is claimed is:

1. A position adjustment device for a steering handle, comprising:
   a fixed bracket;
   a movable bracket;
   a bolt shaft section for coupling said fixed bracket and movable bracket;
   a collar member that is installed between respective supporting side sections of said movable bracket that are mutually opposing in a lateral direction thereof, the collar member comprising a folded shape from a lower supporting plate section and an upper supporting plate section that are mutually opposing in a parallel fashion and combined together with a coupling plate, and the collar member comprising:
      an end plate formed integrally with the upper supporting plate section on a side opposite to that of said coupling plate; and
      a fitting section formed at a lower end of said end plate; and
   a stopper buffering material, the stopper buffering material being fixed to the end plate of said collar member.

2. The position adjustment device for a steering handle according to claim 1, wherein an auxiliary fitting section is formed in said coupling plate of said collar member, an installation hole is formed in the lower supporting plate section in a vicinity of a region where the fitting piece is formed, and an auxiliary stopper buffering material having a smaller width than that of said stopper buffering material is installed on said auxiliary fitting section.

3. The position adjustment device for a steering handle according to claim 1, wherein said stopper buffering material comprises abutment sections abutting against said bolt shaft section, formed symmetrically in an approximately parallel fashion at a suitable interval apart, and at least one of a fitting through hole capable of fitting with said first fitting piece and said auxiliary fitting section is formed between the abutment sections.

4. The position adjustment device for a steering handle according to claim 1, wherein said fitting section comprises a fitting projection extending from said lower end of said end plate.

5. The position adjustment device for a steering handle according to claim 1, wherein said fitting section comprises:
   a constricted section; and
   a fitting projection having a greater width than said constricted section.

6. The position adjustment device for a steering handle according to claim 1, wherein said stopper buffering material comprises a fitting portion for receiving said fitting section.

7. The position adjustment device for a steering handle according to claim 1, further comprising:
   an installation space provided between said lower supporting plate and said end plate for receiving said stopper buffering material.

8. A position adjustment device for a steering handle, comprising:
   a fixed bracket;
   a movable bracket;
   a bolt shaft section for coupling said fixed bracket and movable bracket;
   a collar member that is installed between respective supporting side sections of said movable bracket that are mutually opposing in a lateral direction thereof, the collar member comprising a folded shape from a lower supporting plate section and an upper supporting plate section that are mutually opposing in a parallel fashion and combined together with a coupling plate, and the collar member comprising:
      an end plate formed integrally with the upper supporting plate section on a side opposite to that of said coupling plate; and
      a first fitting section connected to a lower end of said end plate and comprising a constricted section and a fitting projection formed to a greater width than said constricted section; and
   a stopper buffering material firmly fitted with said first fitting section, the stopper buffering material comprising a fitting through hole having a smaller width than the fitting projection of said first fitting section.

9. The position adjustment device for a steering handle according to claim 8, wherein an auxiliary fitting section is formed in said coupling plate of said collar member, an installation hole is formed in the lower supporting plate section in a vicinity of a region where the first fitting section is formed, and an auxiliary stopper buffering material having a smaller width than that of said stopper buffering material is installed on said auxiliary fitting section.

10. The position adjustment device for a steering handle according to claim 8, wherein said stopper buffering material comprises abutment sections abutting against said bolt shaft section, formed symmetrically in an approximately parallel fashion at a suitable interval apart, and at least one of a fitting through hole capable of fitting with said first fitting section and said auxiliary fitting section is formed between the abutment sections.

11. A position adjustment device for a steering handle, comprising:
- a fixed bracket;
- a movable bracket;
- a bolt shaft section for coupling said fixed bracket and movable bracket; and
- a collar member that is installed between respective supporting side sections of said movable bracket that are mutually opposing in a lateral direction thereof, the collar member comprising a folded shape from a lower supporting plate section and an upper supporting plate section that are mutually opposing in a parallel fashion and combined together with a coupling plate, and the collar member comprising:
  - an end plate formed integrally with the upper supporting plate section on a side opposite to that of said coupling plate; and
  - a second fitting section comprising: a left pair and a right pair of hook-shaped projecting pieces comprising vertical projecting pieces formed at a lower end and at the laterally opposite sides of the end plate, and horizontal projecting pieces projecting inwards from the vertical projecting pieces respectively; and
- a stopper buffering material, respective side locations of said stopper buffering material in the lateral direction thereof being firmly fitted with the hook-shaped pieces of said second fitting section.

12. The position adjustment device for a steering handle according to claim 11, wherein a first fitting section comprising a constricted section and a fitting projection formed to a greater width than the constricted section is formed from the lower end of said end plate, at an approximately central position between the two hook-shaped fitting pieces of said second fitting section, and
wherein said stopper buffering material is fitted with and fixed by said first fitting section and second fitting section.

13. The position adjustment device for a steering handle according to claim 12, wherein an auxiliary fitting section is formed in said coupling plate of said collar member, an installation hole is formed in the lower supporting plate section in a vicinity of a region where the first fitting section is formed, and an auxiliary stopper buffering material having a smaller width than that of said stopper buffering material is installed on said auxiliary fitting section.

14. The position adjustment device for a steering handle according to claim 12, wherein said stopper buffering material comprises abutment sections abutting against said bolt shaft section, formed symmetrically in an approximately parallel fashion at a suitable interval apart, and at least one of a fitting through hole capable of fitting with said first fitting section and said auxiliary fitting section is formed between the abutment sections.

15. The position adjustment device for a steering handle according to claim 11, wherein a vertical guide piece is formed between the two hook-shaped projecting pieces of the second fitting section, and
wherein said vertical guide piece is insertable into a fitting through hole of said stopper buffering material.

16. The position adjustment device for a steering handle according to claim 15, wherein an auxiliary fitting section is formed in said coupling plate of said collar member, an installation hole is formed in the lower supporting plate section in a vicinity of a region where the first fitting section is formed, and an auxiliary stopper buffering material having a smaller width than that of said stopper buffering material is installed on said auxiliary fitting section.

17. The position adjustment device for a steering handle according to claim 5, wherein said stopper buffering material comprises abutment sections abutting against said bolt shaft section, formed symmetrically in an approximately parallel fashion at a suitable interval apart, and at least one of a fitting through hole capable of fitting with said first fitting section and said auxiliary fitting section is formed between the abutment sections.

18. The position adjustment device for a steering handle according to claim 11, wherein an auxiliary fitting section is formed in said coupling plate of said collar member, an installation hole is formed in the lower supporting plate section in a vicinity of a region where the first fitting section is formed, and an auxiliary stopper buffering material having a smaller width than that of said stopper buffering material is installed on said auxiliary fitting section.

19. The position adjustment device for a steering handle according to claim 11, wherein said stopper buffering material comprises abutment sections abutting against said bolt shaft section, formed symmetrically in an approximately parallel fashion at a suitable interval apart, and at least one of a fitting through hole capable of fitting with said first fitting section and said auxiliary fitting section is formed between the abutment sections.

* * * * *